United States Patent

Kawamoto

[11] Patent Number: 5,975,451
[45] Date of Patent: Nov. 2, 1999

[54] WEBBING TAKE-UP DEVICE

[75] Inventor: Yoshihiro Kawamoto, Toyota, Japan

[73] Assignee: Toyota Jidosha Kabushiki Kaisha, Toyota, Japan

[21] Appl. No.: 09/077,449

[22] PCT Filed: Nov. 29, 1996

[86] PCT No.: PCT/JP96/03508

§ 371 Date: May 29, 1998

§ 102(e) Date: May 29, 1998

[87] PCT Pub. No.: WO97/19837

PCT Pub. Date: Jun. 5, 1997

[30] Foreign Application Priority Data

Nov. 30, 1995 [JP] Japan ..................................... 7-312439

[51] Int. Cl.[6] .................................................. B60R 22/28
[52] U.S. Cl. ......................................................... 242/379.1
[58] Field of Search ......................... 242/379.1; 280/805, 280/806; 297/470, 471, 472

[56] References Cited

U.S. PATENT DOCUMENTS

| | | | |
|---|---|---|---|
| 4,322,046 | 3/1982 | Tanaka et al. | 242/379.1 |
| 5,687,925 | 11/1997 | Sayles | 242/379.1 |
| 5,772,144 | 6/1998 | Tanabe et al. | 242/379.1 |

FOREIGN PATENT DOCUMENTS

| | | |
|---|---|---|
| 54-39827 | 3/1979 | Japan . |
| 54-166621 | 11/1979 | Japan . |
| 64-32260 | 2/1989 | Japan . |
| 3-159842 | 7/1991 | Japan . |
| 5-5618 | 7/1991 | Japan . |
| 7-8109 | 7/1993 | Japan . |
| 7-101310 | 4/1995 | Japan . |
| 52-99519 | 8/1997 | Japan . |

*Primary Examiner*—John M. Jillions
*Attorney, Agent, or Firm*—Kenyon & Kenyon

[57] ABSTRACT

The present invention is a webbing take-up device in which the pulling out amount of the webbing can easily be ensured during an emergency of a vehicle. During an emergency of the vehicle, the webbing take-up shaft (16) in the webbing take-up device (10) is locked by a pair of energy absorbing gears (22). When winding/tightening load of a webbing (14) increases, the fastening force by which a male thread (46) of the energy absorbing gear (22) is screwed into a female thread (44) of an energy absorbing ring (34) increases. Accordingly, when force of a predetermined value or more has been applied to a shear pin (50) and the shear pin (50) is bent in a direction of arrow H, the energy absorbing gear (22) can rotate in a fastening direction so that the webbing (14) is fed out.

4 Claims, 6 Drawing Sheets

WEBBING TAKE-UP DEVICE

TECHNICAL FIELD

The present invention relates to a webbing take-up device, and more particularly to a webbing take-up device with a locking mechanism for locking a webbing when acceleration of a predetermined value or more has been applied to a vehicle, or the like.

BACKGROUND OF THE INVENTION

A conventional example of the so-called Emergency Locking Retractor (ELR), a webbing take-up device with a locking mechanism for locking a webbing when acceleration of a predetermined value or more has been applied to a vehicle during an emergency, or the like is disclosed in Japanese Patent Application Laid-Open No. 7-101310 and is known.

As shown in FIG. 6, in this webbing take-up device, a wheel shaped member 72 is formed by effecting a curving process on a steel plate having a plurality of circular flanges 71 which can be deformed due to winding/tightening load of the webbing 70. This wheel shaped member 72 is fitted onto the outer circumferential portion of a webbing take-up shaft 74, and the webbing 70 is taken up around the outer circumferential portion of the webbing take-up shaft 74. Accordingly, when the webbing take-up shaft 74 is locked and the winding/tightening load of the webbing 70 increases and becomes a predetermined value or more, the circular flanges 71 deform or collapse due to the winding/tightening load of the webbing 70. The diameter of the webbing take-up portion gets smaller and the webbing 70 is fed out. For this reason, it is possible to feed out a predetermined amount of the webbing 70 without increasing the winding/tightening load of the webbing 70, during which an optimal state of the webbing 70 can be maintained.

However, in this webbing take-up device, a feeding amount of the webbing 70 is determined by a variation amount of the diameter of a take-up portion of the webbing 70, i.e., a collapsing amount of each of the circular flanges 71 in a height H direction thereof. For this reason, in order to increase the feeding length of the webbing 70, the height H of the circular flange 71 must be increased. However, because the whole size of the webbing take-up device is restricted, the height H of the circular flange 71 cannot be increased to a large degree. As a result, it is difficult for the webbing take-up device to obtain an optimal webbing pulling out amount.

In the related art, Japanese Patent Application Laid Open (JP-A) No. 3-159842 discloses an example of a webbing take-up device in which, when the value of load which has been applied to the webbing is high, energy is absorbed by moving a mounting bracket for mounting the webbing take-up device to an inner panel of the device, toward the inner panel. Japanese Patent Application Laid Open (JP-A) No. 64-32260 discloses an example of a webbing take-up device in which, when the value of impact force which has been applied to the webbing is large, the webbing is steadily fed by impact damping means.

In view of the aforementioned facts, it is an object of the present invention to provide a webbing take-up device in which the optimal pulling out amount of the webbing can easily be ensured during an emergency of a vehicle.

DISCLOSURE OF THE INVENTION

The present invention is a webbing take-up device comprising a base fixed to a vehicle, a webbing take-up shaft which is disposed so as to be rotatable at the base for taking up a webbing, webbing feeding prohibiting means having a tooth portion for meshing with a lock plate which is mounted on the webbing take-up shaft. Rotation of the webbing take-up shaft is prohibited during an emergency by the lock plate and the tooth portion meshing with each other. The present invention also comprises winding/tightening load holding means which allows for the rotation of the webbing feeding prohibiting means in a webbing feeding direction when the winding/tightening load of the webbing is equal to or more than a predetermined value so that the winding/tightening load can be kept substantially constant. As a result, during emergency of a vehicle, the feeding of the webbing is prohibited by the webbing feeding prohibiting means. However, when winding/tightening load of the webbing is equal to or more than a predetermined value, because the webbing feeding prohibiting means is rotated through the winding/tightening load holding means with respect to the base so that the webbing is fed, it can be facilitated to obtain the optimum pulling out amount of the webbing during an emergency of a vehicle.

Further, in this case, the winding/tightening load holding means includes an extension member which connects the base and the webbing feeding prohibiting means, a first thread portion which is provided at the base side, a second thread portion which is provided at the webbing feeding prohibiting means and is screwed into the first thread portion, and rotation preventing means which prevents the webbing feeding preventing means from rotating in a webbing feeding direction, wherein, in a case in which winding/tightening load of the webbing is equal to or more than a predetermined value, the rotation preventing means is cancelled, the second thread portion moves along the first thread portion, and the webbing feeding prohibiting means rotates with respect to the base. Accordingly, when the winding/tightening load of the webbing is equal to or more than a predetermined value, in a state in which the extension member is extended, the webbing feeding prohibiting means rotates toward the base so that the webbing is fed out. Accordingly, in a state in which tension of the webbing is kept substantially constant, the optimum pulling out amount of the webbing during an emergency of the vehicle can be ensured.

Moreover, since the webbing take-up device is structured such that the second thread portion is screwed into the first thread portion, and the webbing feeding prohibiting means is stopped from rotating after the rotation preventing means has been cancelled, the operational limit (stop of the feeding of the webbing) can be effected on the webbing by degrees in accordance with the increase of fastening torque. As a result, the increase of the webbing winding/tightening load can be facilitated smoothly.

DESCRIPTION OF THE PREFERRED EMBODIMENTS

With reference to FIGS. 1 through 5, an embodiment of a webbing take-up device according to the present invention will be explained hereinafter.

Figure 2:
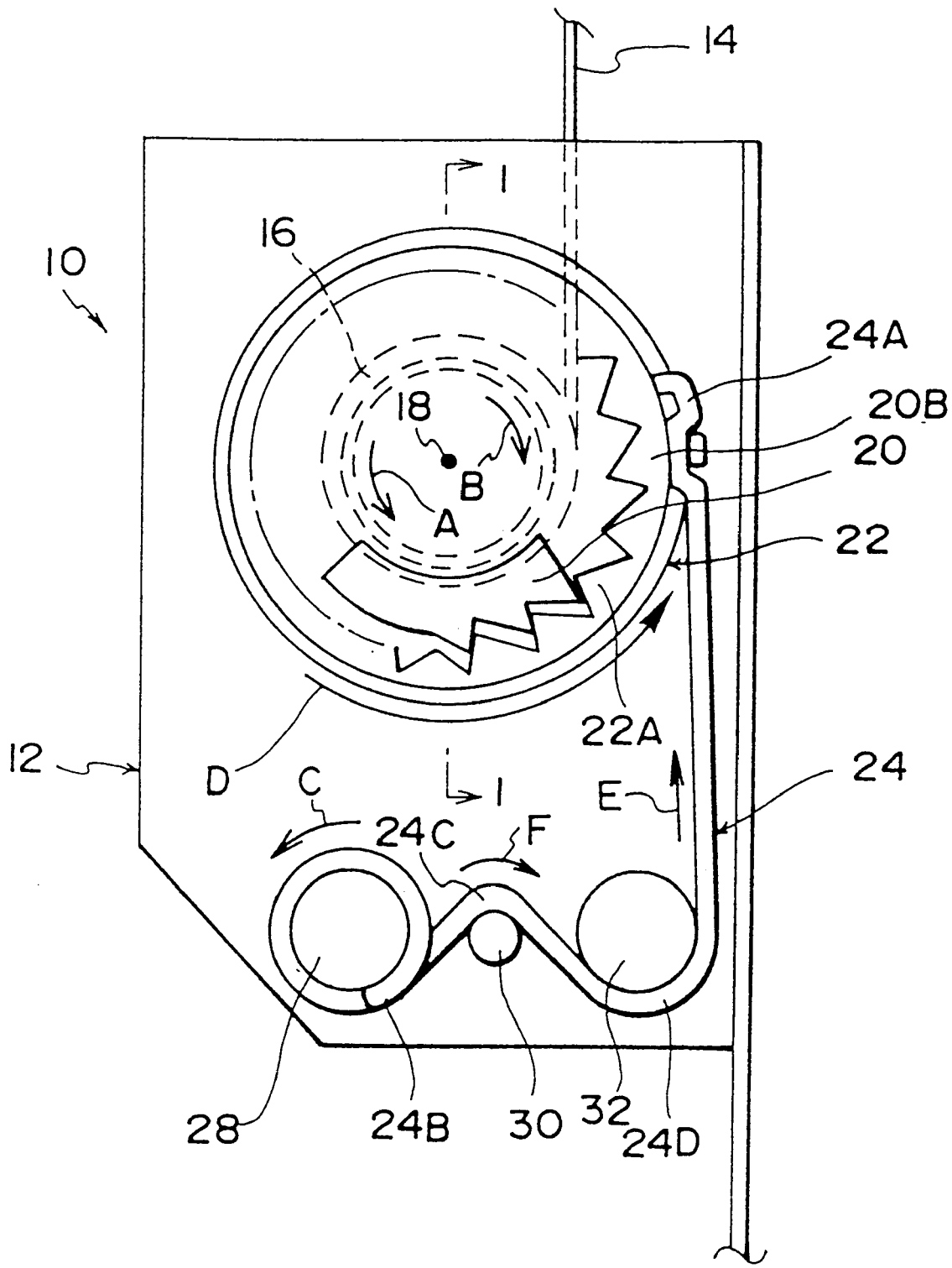
FIG. 2 is a side view which illustrates main portions of a webbing take-up device according to an embodiment of the present invention.

As shown in FIG. 2, a base 12 of a webbing take-up device 10 according to the present embodiment is fixed to a vehicle. A webbing take-up shaft 16 for taking up a webbing 14 is supported by this base 12 so as to be rotatable around an axis line 18 in a webbing feeding direction (i.e., a direction indicated by arrow A in FIG. 2) and in a webbing taking-up direction (i.e., a direction indicated by arrow B in FIG. 2), through other structural members which are not shown.

Further, the webbing take-up device 10 is an emergency locking retractor (ELR) which prohibits the webbing from being fed out during a vehicle emergency. In a case in which an impact has been applied to the device during a vehicle emergency, or the like, in the same manner as a well known ELR, a lock plate 20 meshes with a tooth portion 22A in order to stop the webbing take-up shaft 16 from rotating. The tooth portion 22A is formed at the inner circumferential portion of each of a pair of energy absorbing gears 22 which is formed in a ring-shape and serves as webbing feeding prohibiting means.

Further, an energy absorbing wire 24 serves as an extension member and forms a portion of the winding/tightening load holding means in order to feed the webbing 14 when the winding/tightening load of the webbing has a predetermined value or more. One end portion 24A of the energy absorbing wire 24 is anchored to the outer circumferential portion 22B of the energy absorbing gear 22. The adjacent portion of the other end portion 24B of the energy absorbing wire 24 is wound around a shaft 28 vertically projecting from the base 12, in a coiled state from the end portion 24B of the energy absorbing wire 24 in a counterclockwise direction of the wire (i.e., a direction of arrow C in FIG. 2). Further, a mountain portion 24C is formed at an intermediate portion of the energy absorbing wire 24, and a valley portion 24D is formed at the end portion 24A side of the mountain portion 24C. The mountain portion 24C engages with a small diameter shaft 30 at the side adjacent to the shaft 28. The valley portion 24D engages with a shaft 32 which is provided at a position opposing the shaft 28 by interposing the small diameter shaft 30 between the shaft 28 and the shaft 32.

Accordingly, in a case in which the energy absorbing gear 22 rotates in a counterclockwise direction in FIG. 2 (in a direction of arrow D in FIG. 2), the energy absorbing wire 24 is wound around the outer circumferential portion of the energy absorbing gear 22, and due to plastic deformation, the energy absorbing wire 24 moves along in directions indicated by arrows E and F.

Figure 1:
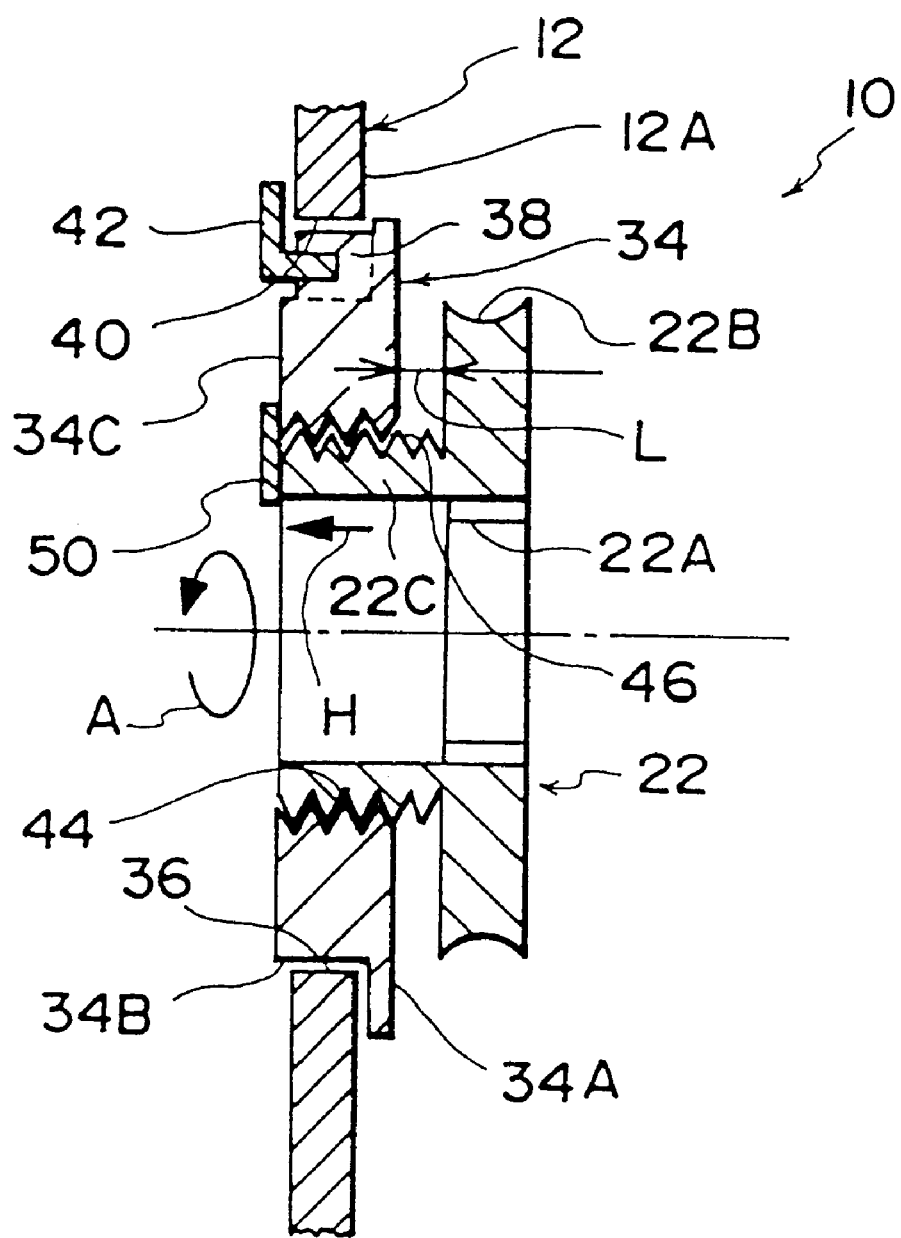
FIG. 1 is a cross sectional view taken along line 1—1 of FIG. 2.

As shown in FIG. 1, each of a pair of the energy absorbing gears 22 is disposed externally on the pair of side wall portions 12A of the base 12, and is screwed into each of the energy absorbing rings 34. The energy absorbing ring 34 is fixed to a pair of the side wall portions 12A of the base 12, respectively, and serves as a member which is fixed to the base 12.

Figure 3:
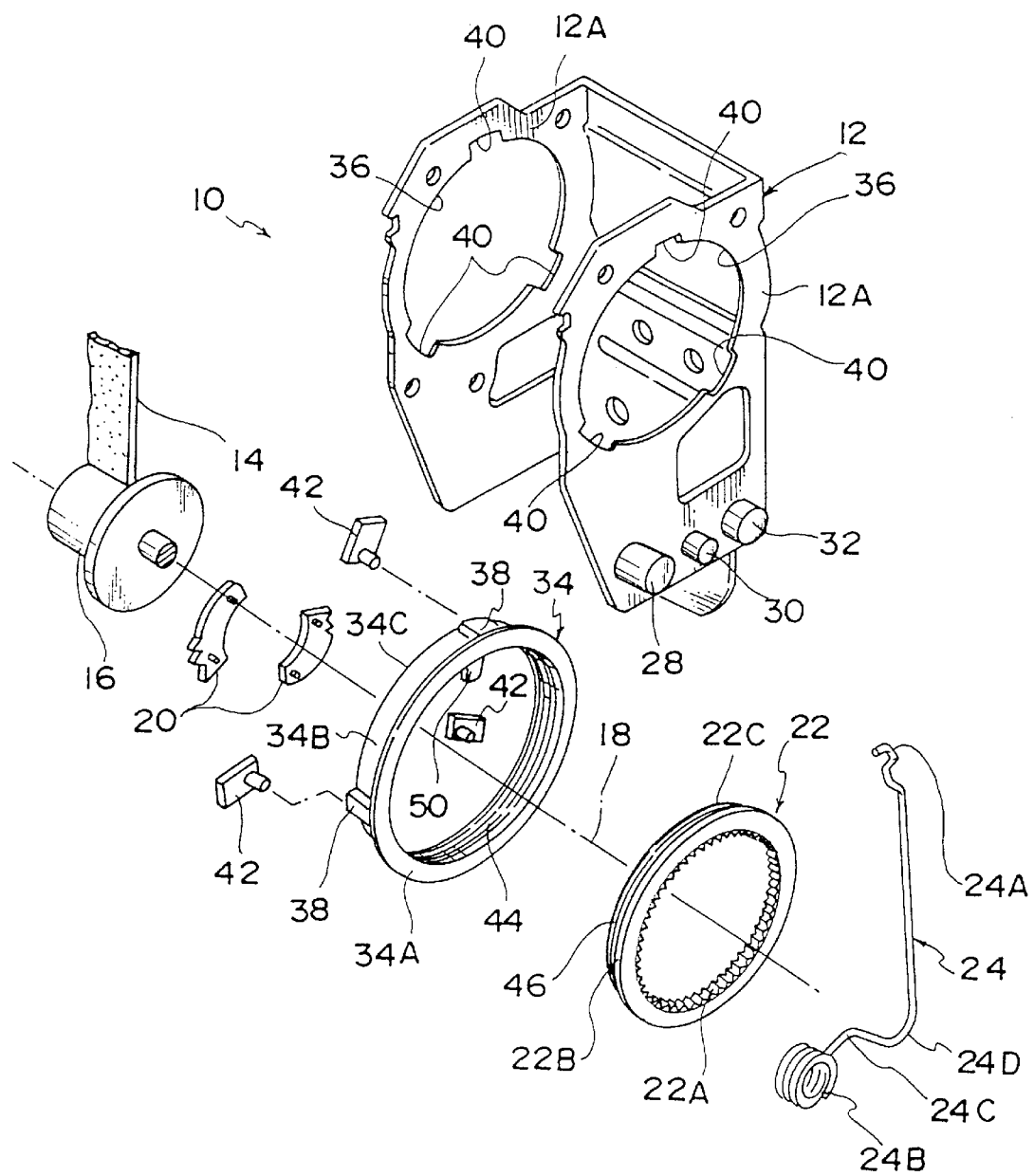
FIG. 3 is a perspective view which illustrates main portions of the webbing take-up device according to the present embodiment.

As shown in FIG. 3, the energy absorbing ring 34 is inserted into a circular hole 36 which is perforated through each of the side wall portions 12A of the base 12 by providing a flange 34A outwardly from the side wall portion 12A. Three detent pawl portions 38, which are formed at the outer circumferential portion 34B of the energy absorbing ring 34, engage with three notches 40, respectively, which are formed at the edge portion of the circular hole 36. In FIG. 3, a pair of the energy absorbing gears 22 and a pair of the energy absorbing rings 34 are disposed outwardly from a pair of the side wall portions 12A of the base 12, respectively. However, only one of the pair of the energy absorbing gears 22 and one of the pair of the energy absorbing rings 34 are shown in FIG. 3, respectively.

Figure 4:
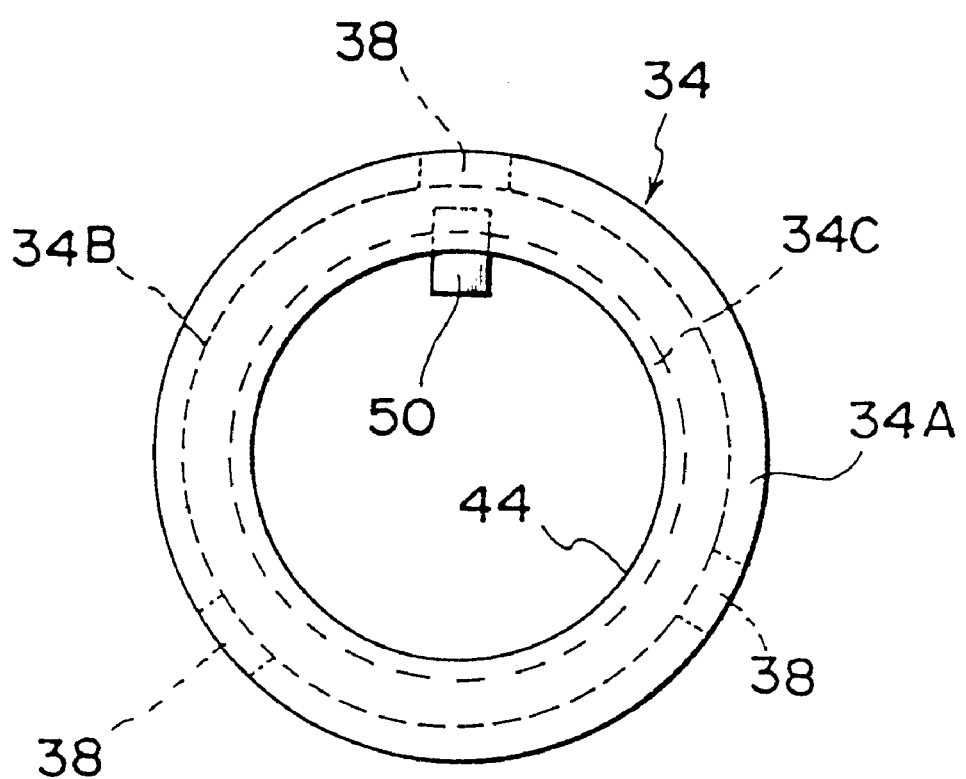
FIG. 4 is a side view which illustrates one of energy absorbing rings of the webbing take-up device according to the present embodiment.

As shown in FIG. 4, The detent pawl portions 38 are formed at three points of the energy absorbing ring 34 so as to be spaced apart from each other at an equal distance along a circumferential direction of the energy absorbing ring 34.

As shown in FIG. 1, rivets 42 are driven into the detent pawl portions 38, respectively, from the inner side portion of the base 12 so that the energy absorbing ring 34 is not removed from the base 12. A female thread 44 serving as a first thread portion which makes up a portion of winding/tightening load holding means is provided at the internal circumferential portion of the energy absorbing ring 34. A portion of a male thread 46 serving as a second thread portion which forms a portion of the winding/tightening load holding means is screwed into the female thread 42. Moreover, the male thread 46 is formed at the outer circumferential portion of a cylindrical portion 22C projecting from the energy absorbing gear 22 to the inner side portion of the base 12 along the axial direction of the energy absorbing gear 22 (along a leftward direction of FIG. 1). Further, a gap L is formed between the energy absorbing gear 22 and the energy absorbing ring 34.

A shear pin 50, which serves as rotation preventing means forming a portion of the winding/tightening load holding means, is fixed to an end surface 34C opposing the flange 34A of the energy absorbing ring 34. The end surface of the cylindrical portion 22C of the energy absorbing gear 22 abuts the shear pin 50 in order to prevent the energy absorbing gear 22 from rotating in a feeding direction of the webbing. Further, in a case in which the energy absorbing gear 22 rotates in the direction of arrow A in FIG. 2 and is apt to move leftward in FIG. 1 (the direction of arrow H in FIG. 1), and force of a predetermined value or more has been applied to the shear pin 50, the shear pin 50 bends in the direction of arrow H. This allows for the movement of the energy absorbing gear 22 in a direction of arrow H, i.e., the rotation of the energy absorbing gear 22 in a direction of arrow A.

Next, an operation of the present embodiment will be explained hereinafter.

In the webbing take-up device 10 according to the present embodiment, during an emergency of a vehicle, when an impact has been applied to the device, the lock plate 20 of the webbing take-up shaft 16 meshes with the tooth portion 22A of the energy absorbing gear 22 and locks the webbing take-up shaft 16. At this time, the rotation of the energy absorbing gear 22 is stopped by the shear pin 50 and the energy absorbing wire 24.

In this state, when the winding/tightening load of the webbing 14 increases, and fastening force by the male thread 46 of the energy absorbing gear 22 which is screwed into the female thread 44 of the energy absorbing ring 34 increases, force of a predetermined value or more has been applied to the shear pin 50 by the energy absorbing gear 22 in the direction of arrow H in FIG. 1. Accordingly, the shear pin 50 bends in the direction of arrow H. This allows for the movement of the energy absorbing gear 22 in the direction of arrow H, i.e., the rotation of the energy absorbing gear 22 in a fastening direction (a direction of arrow A).

Therefore, the energy absorbing gear 22 rotates in the direction of arrow D in FIG. 2, resisting the engaging force from the energy absorbing wire 24, during which the energy absorbing wire 24 which has been fed due to plastic deformation is wound around the outer circumferential portion 22B of the energy absorbing gear 22. For this reason, the webbing take-up shaft 16 rotates in a direction of arrow D in FIG. 2, and the webbing 14 is fed.

When the energy absorbing gear 22 further rotates, and the male thread 46 of the energy absorbing gear 22 is fully screwed into the female thread 44 of the energy absorbing ring 34, the gap L between the energy absorbing gear 22 and the energy absorbing ring 34 is lost. Accordingly, the rotation of the energy absorbing gear 22 is stopped, and the feeding of the webbing 14 is thereby stopped.

Figure 5:
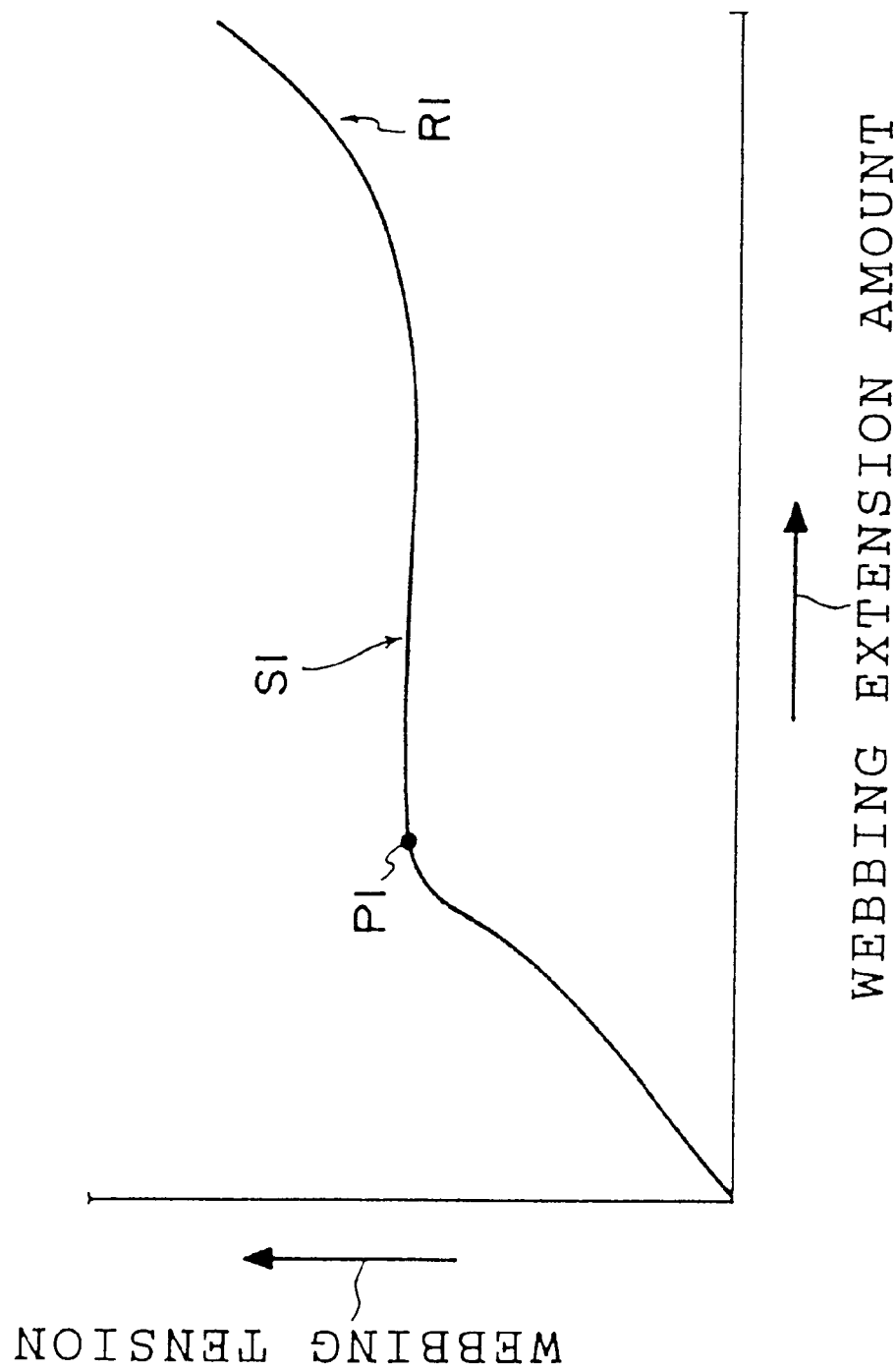
FIG. 5 is a graph which represents the relationship between the extension amount and tension of the webbing of the webbing take-up device.
Figure 6:
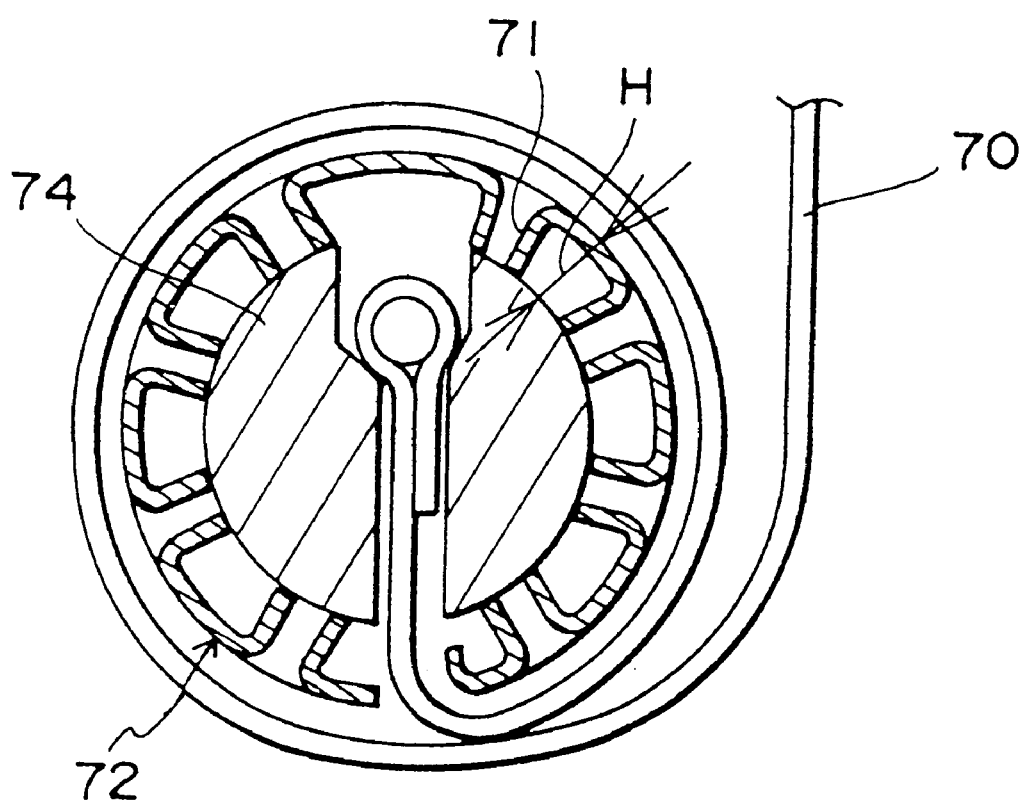
FIG. 6 is a side cross sectional view which illustrates main portions of a webbing take-up device according to a conventional embodiment.

Namely, as shown in FIG. 5, until the point P1 from which the energy absorbing gear 22 begins to rotate, the webbing tension increases substantially in proportion to the webbing extension amount. In this case, the tooth portion 22A of the energy absorbing gear 22 meshes with the lock plate 20. Accordingly, the webbing extension amount increases because feeding through winding/tightening of the webbing and extension through the tension of the webbing.

Next, the shear pin 50 bends in a direction of arrow H at the point P1. This allows for the movement of the energy absorbing gear 22 in the direction of arrow H, i.e., the rotation of the energy absorbing gear 22 in a fastening direction (a direction of arrow A). For this reason, the energy absorbing wire 24 is wound around the outer circumferential portion 22B of the energy absorbing gear 22 and feeds the webbing by degrees due to plastic deformation. Accordingly, as indicated by a linear portion S1 after the point P1, tension of the webbing can be maintained without increase.

Next, a movement termination point is a point of the time at which the energy absorbing gear 22 is disabled to move (at the time when the gap L has been lost in FIG. 1). The male thread 46 of the energy absorbing gear 22 and the female thread 44 of the energy absorbing ring 34 are fastened to each other so that the rotation of the gear 22 is stopped. For this reason, as indicated by a curve portion R1 following a linear line S1 in FIG. 5, in accordance with the increase of fastening torque, an operational limit (stopping the increase of the webbing feeding amount) on the webbing can be effected gradually. Accordingly, the tension of the webbing (winding/tightening load of the webbing) increases smoothly.

Therefore, in the webbing take-up device 10 according to the present invention, by increasing the gap L between the energy absorbing gear 22 and the energy absorbing ring 34, during an emergency of the vehicle, or the like, the webbing feeding becomes longer than that of a conventional embodiment. For this reason, an optimum feeding amount of the webbing can be ensured.

As described above, while this invention has been described in conjunction with a preferred embodiment thereof, it is evident that many alternatives, modifications, and variations will be apparent to those skilled in the art. Accordingly, it is intended to embrace all such alternatives, modifications and variations that fall within the spirit and broad scope of the appended claims. For example, in the present embodiment, the energy absorbing rings 34 have been provided separately from the base 12. Alternatively, the energy absorbing rings 34 may be integrated with the base 12. Further, instead of this, an extending member which extends due to elastic deformation can be used.

FIELD OF THE INVENTION

As described above, the webbing take-up device according to the present invention can be suitable for a webbing take-up device for a seat belt in an automobile or the like in order to protect a vehicle passenger sitting in a vehicle seat. In particular, it is more suitable for a webbing take-up device with a locking mechanism for locking the webbing when an acceleration of a predetermined value or more has been applied to the webbing, or the like.

What is claimed is:

1. A webbing take-up device comprising:

a base fixed to a vehicle;

a webbing take-up shaft which is disposed so as to be rotatable at said base for taking up a webbing;

webbing feeding prohibiting means having a tooth portion for meshing with a lock plate which is mounted on said webbing take-up shaft and the rotation of said webbing take-up shaft is prohibited by the lock plate and the tooth portion meshing with each other during an emergency of a vehicle; and winding/tightening load holding means which allows for the rotation of said webbing feeding prohibiting means in a webbing feeding direction in a case in which winding/tightening load of the webbing is equal to or more than a predetermined value so that the winding/tightening load can be kept substantially constant, wherein said winding/tightening load holding means includes:

a first thread portion which is provided at said base side;

a second thread portion which is provided at said webbing feeding prohibiting means and is screwed into said first thread portion; and rotation preventing means which prevents said webbing feeding preventing means from rotating in a webbing feeding direction, wherein, in a case which the winding/tightening load of the webbing is equal to or more than a predetermined value, said rotation preventing means is canceled, said second thread portion moves along said first thread portion, and said webbing feeding prohibiting means rotates with respect to said base.

2. The webbing take-up device according to claim 1, wherein said first thread portion is a female thread which is formed on a member fixed to a base, and said second thread portion is a male thread, wherein said second thread portion is screwed into said first thread portion so that said webbing feeding prohibiting means is stopped from rotating after said rotation preventing means has been canceled.

3. The webbing take-up device according to claim 2, wherein said rotation preventing means is a shear pin which is provided at a member fixed to said base.

4. The webbing take-up device according to claim 1, further comprising an extension member connected to said base and said webbing feeding prohibiting means, said extension member forms a portion of the winding/tightening load holding means in order to feed the webbing when the winding/tightening load of the webbing has a value greater than or equal to the predetermined value.

* * * * *